Aug. 28, 1956 J. M. WALL 2,760,403
INTERMITTENT MECHANISM FOR MOTION PICTURE MACHINES
Filed May 6, 1952 3 Sheets-Sheet 1

INVENTOR.
JOHN M. WALL
BY D. Emmett Thompson
Attorney

Aug. 28, 1956 J. M. WALL 2,760,403
INTERMITTENT MECHANISM FOR MOTION PICTURE MACHINES
Filed May 6, 1952 3 Sheets-Sheet 2

INVENTOR.
JOHN M. WALL
BY D. Emmett Thompson
Attorney

Aug. 28, 1956  J. M. WALL  2,760,403
INTERMITTENT MECHANISM FOR MOTION PICTURE MACHINES
Filed May 6, 1952  3 Sheets-Sheet 3

INVENTOR.
JOHN M. WALL
BY D. Emmett Thompson
Attorney

United States Patent Office 2,760,403
Patented Aug. 28, 1956

2,760,403

INTERMITTENT MECHANISM FOR MOTION PICTURE MACHINES

John M. Wall, Syracuse, N. Y.

Application May 6, 1952, Serial No. 286,283

2 Claims. (Cl. 88—18.4)

This invention relates to intermittent mechanisms for motion picture machines, and more particularly to a lock or registration pin structure for holding the film against movement during the dwell period in the movement of the film and while the shutter in the camera, or projector, is open.

There is disclosed in my Patent No. 2,144,277, issued January 17, 1939, cam operated mechanism for intermittently advancing the film, this mechanism functioning to effect rapid movement of the film to provide a longer or greater dwell period for taking, or projecting, the picture. The intermittent mechanism disclosed in said patent also includes a cam operated locking or registration pin for holding the film steady during its dwell period.

In certain motion picture machines, such as cameras employed for photographing pictures, or images, projected on television screens, it is necessary to operate the intermittent mechanism at a greater speed than in taking ordinary motion pictures, and also in decreasing the time during which the film is advanced by the pull-down mechanism and increasing the time the film dwells.

Due to the fact that the television image is produced by the projection of light successively on very small areas of the screen, or face of the tube appearing in lines extending horizontally and vertically on the face of the tube, it is necessary that the movement of the film be very rapid and that the film be locked in registration during its dwell period, and means provided to minimize any movement of the film whatsoever—otherwise, the resolution will be defective and poor.

With cameras now in use, it is not possible to obtain resolution of over 600 lines per inch in photographing images on television screens. I have found that this results in part by the slight fluttering, or movement of the film caused by the entrance and withdrawal of the locking pin during the dwell of the film.

This invention has an object an intermittent mechanism for motion picture machines embodying a pull-down mechanism for intermittently advancing the film, and a lock pin cam controlled actuating mechanism which functions to effect substantially instantaneous insertion and withdrawal of the locking pin, whereby there is no movement of the locking pin, relative to the film during substantially the entire dwell period of the film.

With intermittent film mechanisms embodying my invention, it is possible in photographing televised images to obtain a resolution of 1600, or more, lines per inch.

The invention consists in the novel features and in the combinations and constructions hereinafter set forth and claimed.

In describing this invention, reference is had to the accompanying drawings in which like characters designate corresponding parts in all the views.

In the drawings—

Figure 1:
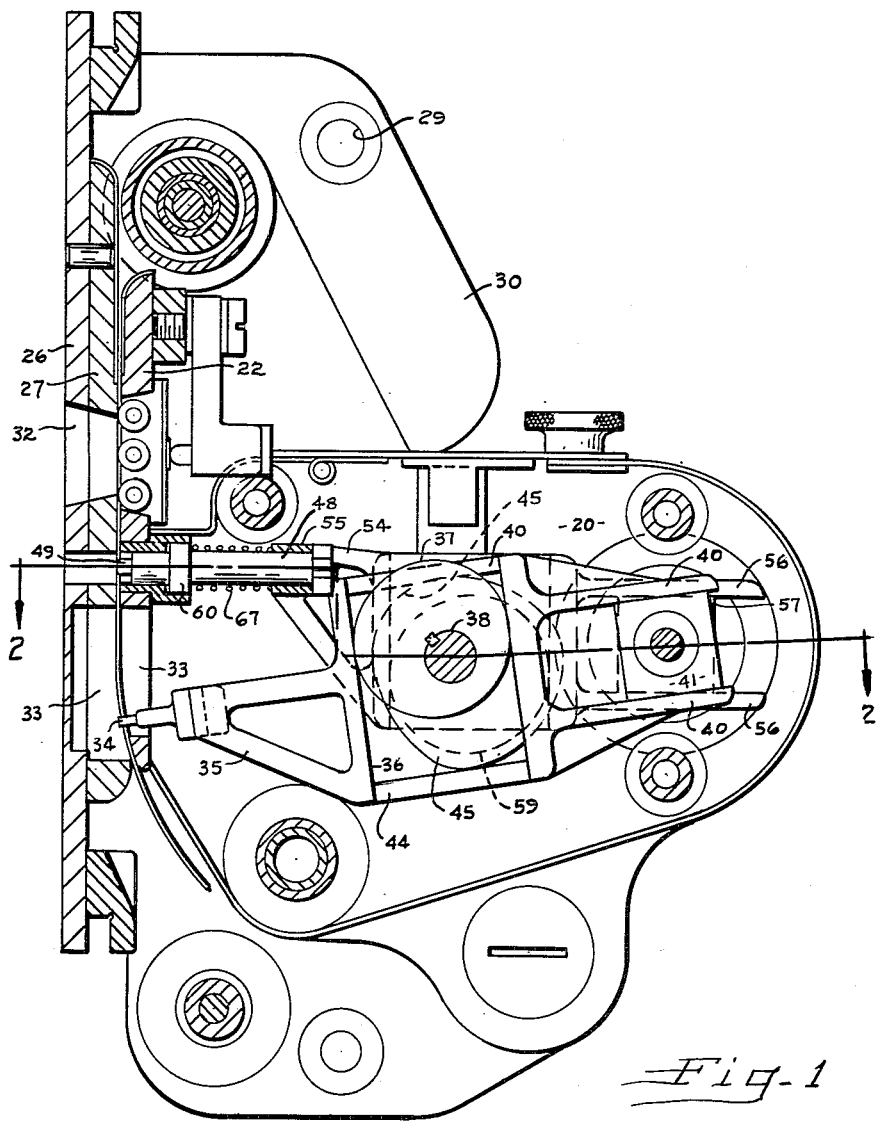
Figure 1 is an enlarged vertical sectional view of an intermittent mechanism embodying my invention, the view being taken on a line corresponding to line 1—1, Figure 2.

The intermittent mechanism consists of a frame including a rear side plate 20, a front side plate 21, an end plate 22 fixed to the side plates, as by screws 23, this structure being mounted in an angle member having rear and front sides 25, 26, respectively, and there is an apertured plate 27 interposed between the end plate 22 and the side 26 of the angle member.

This unit is detachably mounted in the machine by means including a screw 28 and a dowel pin positioned in an aperture 29 in an upwardly extending portion 30 of the rear portion 25 of the angle member. The confronting faces of the plates 22, 27, are relieved to form a vertical passage for the film to move the frames of the film in registration with an aperture 32, and these plates are formed with vertical slots 33 to receive a pull-down pin or claw 34. The pin 34 is mounted on the end of a pull-down arm or lever 35 formed intermediate its ends with a rectangular structure having a pair of vertical ways 36 for engagement with a cam 37 fixedly mounted on a cam shaft 38 journalled in bearings 39 mounted in the rear and front plates 20, 21, see Figure 2.

The arm 35 is formed at its opposite ends with a pair of spaced apart projections 40 slidably mounted upon a fulcrum block 41 journalled on a shaft 42. The function of the cam 37 is to impart movement of the arm 35 toward and from the film to move the pin 34 into and out of engagement therewith. The lever 35 is also formed with horizontal ways 44 for engagement with a cam 45 mounted on the cam shaft 38 and which functions to impart a vertically reciprocating movement to the arm 35. When the arm has been elevated to the dotted outline position shown in Figure 3, the cam 37 functions to move the arm horizontally to move the pin 34 into engagement with the film. The relative arrangement of the cams 37, 45, is such that the pin is maintained in engagement with the film while the cam 45 moves the arm downwardly to the position shown in Figure 1, whereupon the cam 37 moves the arm rearwardly, withdrawing the pin from the film, and is maintained in this position while the lever is moved upwardly to its top position to repeat the cycle of operation.

Figure 2:
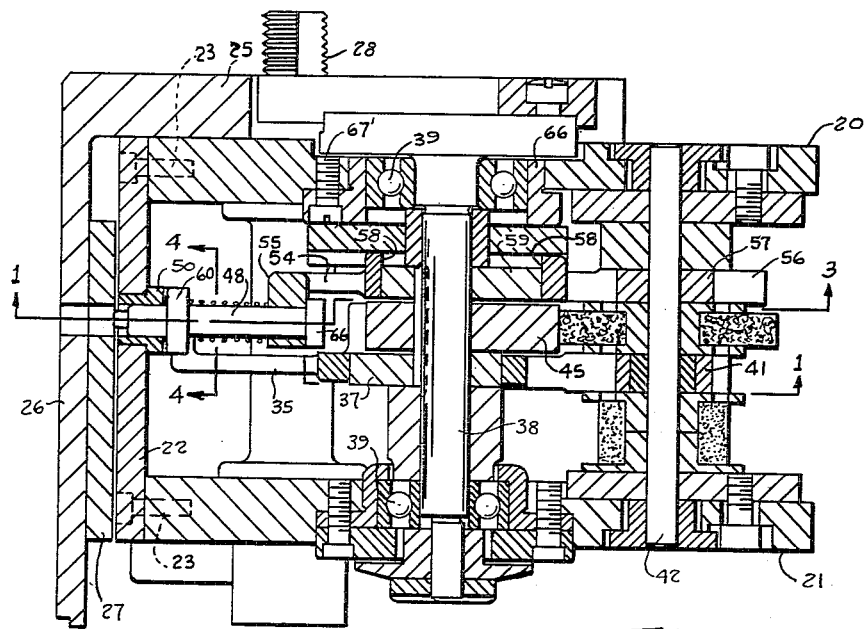
Figure 2 is a horizontal sectional view taken on line 2—2, Figure 1.
Figure 3:
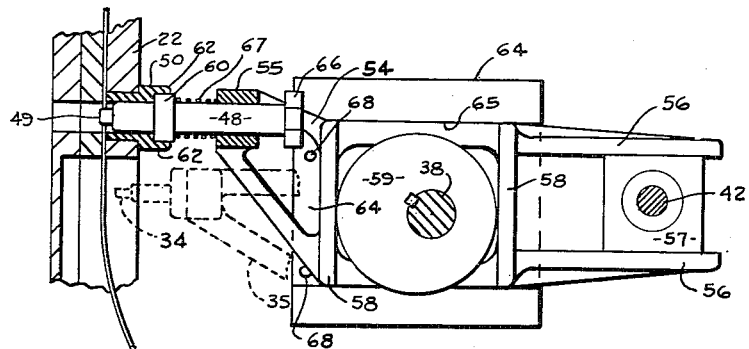
Figure 3 is a view of the lock pin and actuating mechanism taken on a line corresponding to line 1—3, Figure 2, illustrating the lock pin fully engaged in the film.
Figure 4:
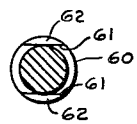
Figure 4 is a view taken on line 4—4, Figure 2.

As soon as the pull-down arm 35 reaches the bottom of its stroke, as shown in Figure 1, a locking pin 48 is moved forwardly to position the point 49 thereof into engagement with the film. The forward end portion of the pin 48 is slidably mounted in a bushing 50 arranged in the end plate 22. Reciprocation of this pin is controlled by an actuating arm 54 having a forward end portion in the nature of a collar 55. In Figures 1 to 3, this collar is slidably mounted upon the inner end portion of the pin. The arm or lever is also provided with spaced apart rearwardly extending projections 56 slidably mounted on a fulcrum block 57 journalled on the shaft 42. The lever 54 is formed intermediate its ends with a pair of spaced apart vertical ways 58 engaged by a cam 59 fixedly mounted on the shaft 38. The cam 59 functions to effect horizontal reciprocation to the arm 54. The pin 48 is provided intermediate its ends with a circular enlargement or collar 60 having flat surfaces 61 on its upper and lower sides, and the confronting end of the bushing 50 is formed with a transversely extending slot forming spaced projections 62 engaging the flat surfaces 61 of the collar, the axial length of the projections 62 exceeding the movement of the pin, whereby the collar is slidably mounted in the head portion of the bushing and is restrained against rotation. This bushing and collar serve as stop means to limit the movement of the pin towards the film.

The inner end of the pin 48 is formed with a head or enlargement 66 for engagement by the collar portion 55 of arm 54. A coil compression spring 67 is mounted upon the pin and interposed between the collar 60 of the pin and the collar portion 55 of the arm 54, and serves to yieldingly urge the pin into engagement with the film.

The arrangement of the cams 37, 45, 59, is such that as the arm 35 reaches the bottom of its stroke, as shown in Figure 1, the arm 54 begins its forward movement, causing the tip 49 of the pin 48 to engage the film, this engagement taking place and being completed while the tip 34 of the arm 35 is being withdrawn from the film, and this engaging movement of the pin 48 takes place during only the initial forward movement of the arm 54, the engagement being complete when the collar 60 engages the circular portion of the bushing 50. While the pull-down arm 35 is moving upwardly to the dotted outline position, Figure 3, the arm 54 continues to move forwardly, and then rearwardly, and at the time the tip 34 of arm 35 again enters the film, the collar portion 55 of arm 54 engages the head 66 of pin 48, withdrawing it from the film. The central portion of the arm 54 is slidably mounted in a guide member 64 having horizontally extending guide ways 65. The guide member 64 is fixedly mounted on a bushing 66 secured to the back plate 20, as by screws 67'. The member 64 is fixedly secured to the bushing 66, as by screws 68, see Figures 5 and 7. The guide member 64 serves to support the arm 54 during its reciprocation and prevents any vertical movement of the arm and accordingly avoids the transmission of any vibration to the pin 48.

Due to the fact the film is only a few thousandths of an inch in thickness, it is only necessary for the pin 48 to move .016 of an inch, or less. It would not be practical to construct the cam 59 to directly effect reciprocation of the pin over this short movement, and regardless how short the movement effected directly by the cam, or similar rotating actuator, such as a crank, there would be continuous movement of the tip 49 relative to the film tending, during the dwell thereof, to cause the film to shake or flutter which, in turn, would cause a much lower resolution. In having the continuous reciprocatory movement of the arm of appreciable extent and employing the lost motion connection between the arm and the pin, as described herein, a cam of practical dimension can be used. However, the pin is moved into engagement with the film upon a very slight forward movement of the arm and is withdrawn from the film at the last slight movement upon the return stroke of the arm. Accordingly, the pin is substantially simultaneously engaged and disengaged with the engagement and disengagement of the pull-down pin 34, thereby leaving the film without disturbance throughout substantially its entire dwell period and this, as previously pointed out, results in the taking of an exceptionally clear and distinct picture, or in so projecting a picture from the film when the mechanism is employed in projecting apparatus.

Figure 6:
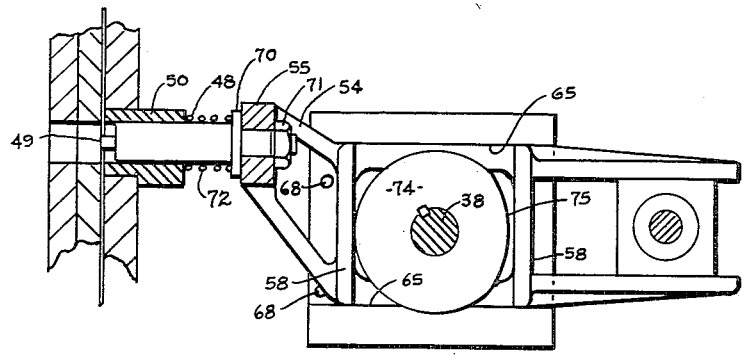
Figure 6 is a side elevation of the modified lock pin taken on a line corresponding to line 6—6, Figure 5.
Figure 5:
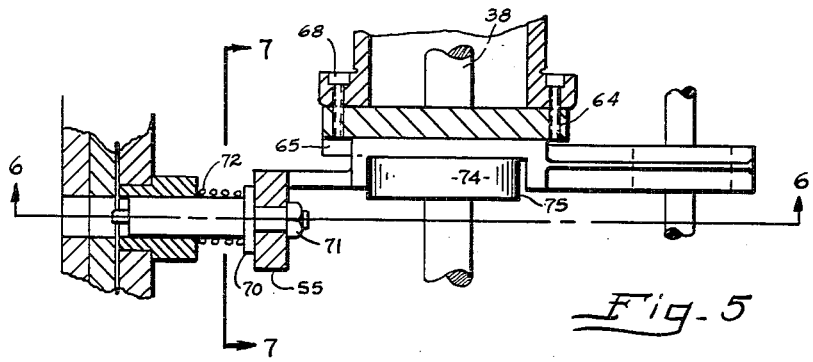
Figure 5 is a horizontal sectional view of a modified form of the lock pin and actuating mechanism shown in Figure 3.
Figure 7:
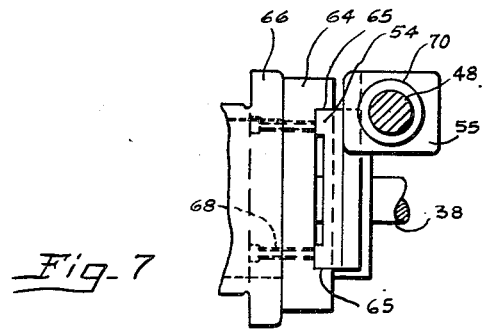
Figure 7 is a sectional view taken on line 7—7, Figure 5.

In Figures 5, 6 and 7, there is shown a modified arrangement for effecting movement of the locking pin. In this arrangement, the locking pin 48 is formed with a collar 70 positioned against the collar 55 of arm 54 and maintained in that position by nut 71 threaded on the inner end of the pin. A compression spring 72 is interposed between the collar 70 and the confronting end of the bushing 50. A cam 74 is provided to effect reciprocation of the arm. However, the periphery of this cam is not of true circular form, as in the case of the cam 59, but is formed with a low portion 75 of relatively short extent while the remaining portion of the cam periphery is of true circular form and concentric with the axis of the shaft 38. The diameter of the cam 74 is somewhat less than the distance or spacing between the vertical ways 58 on the arm 54. The spring 72 functions to move the pin 48 rearwardly from the film and to maintain the forward vertical way 58 of the arm in proximity to the collar 55 against the periphery of the cam 74. The cam 74 is so arranged on the shaft 38 in respect to the cams 37, 45, that the low portion 75 of the cam contacts the forward vertical way 58 of the arm as the pull-down pin 34 enters the film at the upper end of the stroke of the arm, as shown in dotted outline, Figure 3. This permits rearward or outward movement of the pin 48 by the spring 72 to disengage the tip 49 from the film while the pin 34 and arm 35 are moving the film downwardly. The extent of the low portion 75 of the cam 74 is sufficient in circumferential extent to permit the spring 72 to maintain the pin 48 out of engagement with the film during the downward movement thereof. As the pin 34 and arm 35 reach the bottom of the stroke, as shown in Figure 1, the forward way 58 of the arm 34 is engaged by the circular portion of the periphery of the cam 74, moving the pin 48 into engagement with the film and inasmuch as this portion of the cam is circular and concentric with the axis of its rotation, the pin is maintained in engagement with the film without any movement during the dwell period of the film.

In both arrangements, the locking pin is substantially simultaneously moved into and out of engagement with the film and is maintained in locking engagement with the film without any movement of the pin during the dwell period of the film.

What I claim is:

1. An intermittent film mechanism for motion picture machines, a cam shaft, a pull-down mechanism for intermittently advancing the film, a first cam mounted on said shaft for operating said mechanism, a film lock pin provided with an enlargement intermediate its ends, the forward end portion of said pin being of reduced diameter for entrance into the film apertures, a pin actuating arm formed with an apertured portion, the rear portion of said pin being slidably mounted in the apertured portion of the arm for movement relative thereto forwardly toward the film and rearwardly therefrom, said pin having stop means cooperable with the arm for limiting forward movement of the pin relative to the arm, spring means acting between said arm and pin and being operable to yieldingly urge the pin forwardly, and a second cam mounted on said shaft in adjacency to said first cam and operable during the dwell of the pull-down mechanism to reciprocate said arm over a rectilinear path parallel to the movement of said pin toward and from the film to effect movement of the forward end portion of the pin into and out of engagement with the film.

2. An intermittent film mechanism for motion picture machines comprising a frame, a pull-down mechanism for intermittently advancing the film, a film lock pin provided with an enlargement intermediate its ends, the forward end portion of said pin being slidably mounted in the frame for movement forwardly into and rearwardly out of engagement with the film, a pin actuating arm having a portion apertured to slidably receive the rear end portion of the pin, said pin being also provided with an enlargement at its rear end, a spring interposed between the enlargement on the intermediate portion of the pin and the apertured portion of said arm, said spring being operable to yieldingly urge the pin forwardly and the enlargement on the rear end of the pin in engagement with the apertured portion of said arm, a guide member fixedly mounted in the frame for slidably receiving said arm and guiding the same in a rectilinear path parallel to the movement of said pin, and cam means operable during the dwell of the pull-down mechanism to reciprocate said arm over said rectilinear path.

References Cited in the file of this patent

UNITED STATES PATENTS

| | | |
|---|---|---|
| 1,393,735 | Anselmi | Oct. 18, 1921 |
| 1,400,877 | Hillman | Dec. 20, 1921 |
| 1,560,908 | Garbutt | Nov. 10, 1925 |
| 1,579,806 | Ball | Apr. 6, 1926 |
| 1,592,908 | Shaw | July 20, 1926 |
| 1,851,448 | Ross | Mar. 29, 1932 |